US009005806B2

(12) United States Patent
Wei (10) Patent No.: US 9,005,806 B2
(45) Date of Patent: Apr. 14, 2015

(54) NANO-STRUCTURED LITHIUM-SULFUR BATTERY AND METHOD OF MAKING SAME (75) Inventor: Di Wei, Cambridge (GB)

(73) Assignee: Nokia Corporation, Espoo (FI)

( * ) Notice: Subject to any disclaimer, the term of this patent is extended or adjusted under 35 U.S.C. 154(b) by 547 days.

(21) Appl. No.: 12/579,563

(22) Filed: Oct. 15, 2009

(65) Prior Publication Data

US 2011/0091773 A1   Apr. 21, 2011

(51) Int. Cl.
| H01M 4/70 | (2006.01) |
| C01B 33/035 | (2006.01) |
| H01M 4/04 | (2006.01) |
| H01M 4/136 | (2010.01) |
| H01M 4/1397 | (2010.01) |
| H01M 4/36 | (2006.01) |
| H01M 4/58 | (2010.01) |
| H01M 4/62 | (2006.01) |
| H01M 4/66 | (2006.01) |
| H01M 10/052 | (2010.01) |
| H01M 4/02 | (2006.01) |

(52) U.S. Cl.
CPC ............... *H01M 4/70* (2013.01); *C01B 33/035* (2013.01); *H01M 4/0426* (2013.01); *H01M 4/136* (2013.01); *H01M 4/1397* (2013.01); *H01M 4/364* (2013.01); *H01M 4/366* (2013.01); *H01M 4/581* (2013.01); *H01M 4/625* (2013.01); *H01M 4/626* (2013.01); *H01M 4/667* (2013.01); *H01M 10/052* (2013.01); *H01M 2004/021* (2013.01); *Y02E 60/122* (2013.01); *Y02T 10/7011* (2013.01)

(58) Field of Classification Search
None
See application file for complete search history.

(56) References Cited

U.S. PATENT DOCUMENTS

| 3,621,032 A | | 11/1971 | Ariyan et al. ................. 260/327 |
| 4,130,500 A | * | 12/1978 | Melendres et al. ......... 252/182.1 |
| 4,439,502 A | * | 3/1984 | Bittihn et al. ................. 429/104 |
| 5,318,865 A | * | 6/1994 | Kaneko et al. ................ 429/345 |

(Continued)

FOREIGN PATENT DOCUMENTS

| CN | 101262019 A | 9/2008 |
| EP | 1 383 186 A1 | 1/2004 |

(Continued)

OTHER PUBLICATIONS

JP 2003317794 A machine English translation.*

(Continued)

*Primary Examiner* — Ula C Ruddock
*Assistant Examiner* — Scott J Chmielecki
(74) *Attorney, Agent, or Firm* — Harrington & Smith (57) ABSTRACT An apparatus includes a first conductive substrate (e.g., a metal foil) having a first surface; a plurality of conductive stalks (e.g., carbon nano-tubes) extending from the first surface; an electrically insulating coating (e.g., sulfur) about the carbon stalks; a second conductive substrate (e.g., a lithium oxide foil); and an electrolyte (e.g., a polymer electrolyte) disposed between the first surface of the first conductive substrate and the second conductive substrate. In various embodiments: the sulfur is disposed at a thickness of about 3 nanometers+/−1 nanometer; the stalks are at a density such that a gap between them as is between 2 and 200 diameters of an ion transported through the electrolyte; and there is a separator layer within the electrolyte having a porosity amenable to passage by such ions. Also detailed is a method for making the foil with the coated carbon nano-tubes.

9 Claims, 4 Drawing Sheets

(56) References Cited

U.S. PATENT DOCUMENTS

| | | | |
|---|---|---|---|
| 5,601,951 A * | 2/1997 | Johnson et al. | 429/346 |
| 6,017,651 A * | 1/2000 | Nimon et al. | 429/101 |
| 6,194,099 B1 * | 2/2001 | Gernov et al. | 429/213 |
| 6,283,812 B1 * | 9/2001 | Jin et al. | 445/24 |
| 7,060,390 B2 * | 6/2006 | Chen et al. | 429/231.8 |
| 2004/0197638 A1 * | 10/2004 | McElrath et al. | 429/44 |
| 2004/0234841 A1 | 11/2004 | Yoshitake et al. | 429/44 |
| 2005/0118440 A1 | 6/2005 | Mahon et al. | 428/469 |
| 2005/0121309 A1 | 6/2005 | Chhowalla et al. | 204/173 |
| 2006/0051663 A1 | 3/2006 | Fujita et al. | 429/142 |
| 2006/0204853 A1 | 9/2006 | Chen | 429/231.8 |
| 2007/0258192 A1 | 11/2007 | Schindall et al. | 361/503 |
| 2008/0044732 A1 | 2/2008 | Salot et al. | 429/322 |
| 2008/0131779 A1 | 6/2008 | Kami et al. | 429/221 |
| 2008/0280207 A1 | 11/2008 | Patoux et al. | 429/231.8 |
| 2009/0042102 A1 | 2/2009 | Cui et al. | 429/231.9 |
| 2009/0316335 A1 | 12/2009 | Simon et al. | 361/502 |
| 2010/0021797 A1 | 1/2010 | Zhang et al. | 429/42 |
| 2010/0178531 A1 | 7/2010 | Amaratunga et al. | 429/7 |
| 2010/0178568 A1 | 7/2010 | Unalan et al. | 429/317 |
| 2011/0091773 A1 | 4/2011 | Wei | 429/231.8 |
| 2011/0139610 A1 * | 6/2011 | Shirvanian | 204/275.1 |
| 2011/0171559 A1 | 7/2011 | Zhang et al. | 429/481 |
| 2011/0186520 A1 * | 8/2011 | Workman et al. | 210/669 |
| 2011/0200848 A1 * | 8/2011 | Chiang et al. | 429/4 |
| 2011/0242730 A1 * | 10/2011 | Zhou et al. | 361/502 |
| 2012/0082873 A1 * | 4/2012 | Fischel | 429/51 |
| 2013/0026969 A1 * | 1/2013 | Kim et al. | 320/103 |
| 2014/0023940 A1 * | 1/2014 | Zaghib et al. | 429/405 |

FOREIGN PATENT DOCUMENTS

| | | | |
|---|---|---|---|
| JP | 2003317794 | | 11/2003 |
| JP | 2003317794 A * | | 11/2003 |
| JP | 2005-039295 A | | 2/2005 |
| WO | WO 2004/000728 A1 | | 12/2003 |
| WO | WO 2005/069412 A1 | | 7/2005 |
| WO | WO 2005/114686 A1 | | 12/2005 |
| WO | WO 2008/070926 A1 | | 6/2008 |
| WO | WO 2010/089991 A1 | | 8/2010 |
| WO | WO 2010089991 | | 8/2010 |

OTHER PUBLICATIONS

Xiulei Ji, Kyu Tae Lee, & Linda F. Nazar; "A Highly Ordered Nanostructured Carbon-Sulphur Cathode for Lithium-Sulphur Batteries"; Nature Materials, vol. 8, Jun. 2009, pp. 500-506; published online May 17, 2009.*

"A highly ordered nanostructured carbon-sulphur cathode for lithium-sulphur batteries", Xieulei Ji et al., Nature Materials, vol. 8, Jun. 2009, p. 500-506.

"Li/S fundamental chemistry and application to high-performance rechargeable batters", James R. Akridge et al., Solid State Ionics 175, 2004, p. 243-245.

"Lithium phosphorous oxynitride as a passive layer for anodes in lithium secondary batteries", Kwang-il Chung et al., Journal of Electroanalytical Chemistry, 2003, p. 263-267.

"Characterization of N-Methyl=N-Butylpyrrolidinium Bis (trifluoromethanesulfonyl)imide-LiTFSI-Tetra(ethylene glycol) Dimethyl Ether Mixtures as a Li Metal Cell Electrolyte", Joon Ho Shin et al., Journal of The Electrochemical Society, 155, 2008, p. A368-A373.

"Phase Equilibria in Lithium-Chalcogen Systems", P.T. Cunningham, et al., J. Electrochem. Soc., 119, 1972, p. 1448-1450.

"Noncovalent Interaction between Gold Nanoparticles and Multiwalled Carbon Nanotubes via an Intermediatory", Jui-Ming Yeh et al., Journal of Nanotechnology, 2009, p. 1-7.

Endo, M et al., Potential Applications of Carbon Nanotubes, Carbon Nanotubes, Topics Appl. Physics 111, (2008) 13-62.

Heitner, K. (Manager) Advances Promise High Cycle Life, Commerical Viability for Electric Vehicles, Advanced Electric Vehicle Batteries.

M. Stanley Whittingham, "Materials Challenges Facing Electrical Energy Storage", MRS Bulletin, vol. 33, Apr. 2008, pp. 411-420.

Lijie CI et al., "Ultra Thick Freestanding Aligned Carbon Nanotube Films", Advanced Materials 2007; pp. 3300-3303.

H. Wang et al., "Large-Scale Synthesis of Single-Walled Carbon Nanohorns by Submerged Arc"; Institute of Physics Publishing; Nanotechnology 2004; pp. 546-550.

Martin S. Bell, et al., "CarbonNanotubes by Plasma-Enhanced Chemical Vapor Deposition", Pure and Applied Chemistry; vol. 78, No. 6; pp. 1117-1125; 2006.

Hao Zhang et al.; "Growth of Manganese Oxide Nanoflowers on Vertically-Aligned Carbon Nanotube Arrays for High-Rate Electrochemical Capacitive Energy Storage", Nano Letters, 2008 vol. 8; No. 9; pp. 2664-2668.

Pushparaj et al., "Flexible Energy Storage Devices Basedon Nanocomposite Paper", PNAS; Aug. 21, 2007; vol. 104; No. 34; pp. 13574-13577.

Prachi-Patel, "Nanoflowers Improve Ultracapacitors"; Technology Review; Sep. 16, 2008.

Arico et al., "Nanostructured Materials for Advanced Energy Conversion and Storage Devices", Nature Materials 4 (2005) 366.

Yang et al., "Nanowindow-Regulated Specific Capacitance of Supercapacitor Electrodes of Single-Wall Carbon Nanohorns", J. Am. Chem Soc. 129 (2007).

Ji, Xiulei, et al.; "A highly ordered nanostructured carbon—sulphur cathode for lithium—sulphur batteries;" *Nature Materials* 8, 500-506 (2009).

* cited by examiner

NANO-STRUCTURED LITHIUM-SULFUR BATTERY AND METHOD OF MAKING SAME

CROSS REFERENCE TO RELATED APPLICATION

This application concerns subject matter related to subject matter disclosed in co-owned and co-pending U.S. patent application Ser. No. 12/319,933 (filed Jan. 13, 2009) entitled "A Process for Producing Carbon Nanostructure on a Flexible Substrate, and Energy Storage Devices Comprising Flexible Carbon Nanostructure Electrodes", the contents of which is hereby incorporated by reference as if fully recited herein.

TECHNICAL FIELD

The exemplary and non-limiting embodiments of this invention relate generally to electrical energy storage devices and methods for making such devices, and more specifically relate to lithium-sulfur batteries and components thereof.

BACKGROUND

Some requirements for modern batteries include high energy density (product of capacity and voltage) to reduce weight and/or space, the capacity for numerous charge/discharge cycles to enable longer life, and little or no memory effects so that later cycles provide similar electrical potential as earlier cycles when the battery is new.

Lithium-sulfur batteries have one electrode made of lithium and another made of sulfur. But sulfur is an insulating material (sulfur alone being at $5*10^{-30}$ S cm$^{-1}$ at 25° C.), so to improve conductivity in some battery implementations the sulfur electrode is compounded with carbon to act as the battery cathode. As with the conventional lithium ion batteries, charging and discharging the battery involves the movement in an electrolyte of lithium ions between the two electrodes.

The theoretical capacity of lithium-sulfur batteries is much higher than that of lithium-ion batteries because of the way the ions are assimilated at the electrodes. For example, at the sulfur electrode, each sulfur atom can host two lithium ions, while in lithium-ion batteries every host atom can accommodate only 0.5 to 0.7 lithium ions.

Making materials that take advantage of the higher theoretical capacity of lithium-sulfur (Li—S) battery has been a challenge. The fact that sulfur is an insulating material makes it difficult for electrons and ions to move in and out of capture at the sulfur electrode. So while each sulfur atom may in theory be able to host two lithium ions, in fact often only those atoms of sulfur near the surface of the material accept lithium ions. Another problem is that as the sulfur binds to lithium ions and eventually forms dilithium sulfide, it also forms a number of intermediate products called polysulfides. These dissolve in the battery's liquid electrolyte and eventually can settle in other areas of the battery, where they can block charging and discharging. Because of this, prior art lithium sulfur batteries can stop working altogether after only a few dozen cycles.

In traditional lithium ion batteries, the charge storage capability is inherently limited to about 300 mA–h/g, and to the inventor's knowledge the maximum capacities observed are about 180 mA–h/g with high power characteristics. A lithium sulfur battery cell operates quite differently from a lithium ion battery cell. Specifically, the redox couple, which in general is the tendency of a chemical species to reduce by acquiring electrons and which specifically for lithium sulfur batteries is described by the discharge reaction $S_8 \rightarrow Li_2S_8 \rightarrow Li_2S_6 \rightarrow Li_2S_4 \rightarrow Li_2S_3 \rightarrow Li_2S_2 \rightarrow Li_2S$. Polysulfides are reduced on the anode surface in sequence while the cell is discharging:

Across a porous diffusion separator, the polymers of sulfur are formed at the nominal cathode as the cell charges:

This redox couple lies near 2.2 V with respect to Li+/Li, a potential which is only about ⅔ of that exhibited by conventional positive electrodes. However, this is offset by the very high theoretical capacity afforded by the non-topotactic 'assimilation' process of 1675 mAh/g.

Specifically, the chemical processes in the Li—S battery cell include lithium dissolution from the anode surface (and incorporation into polysulfides) during discharge, and lithium plating back on to the nominal anode while charging. This contrasts with conventional lithium-ion cells in which the lithium ions are intercalated in the anode and cathodes, and this distinction allows the Li—S arrangement to exhibit, in theory, a much higher lithium storage density. Compared with intercalation batteries such as lithium-ion types, Li—S cells have the opportunity to provide a significantly higher energy density. Values can approach 2,500 Wh/kg or 2,800 Wh/l on a weight or volume basis respectively, assuming complete reaction to $Li_2S$.

Figure 1:
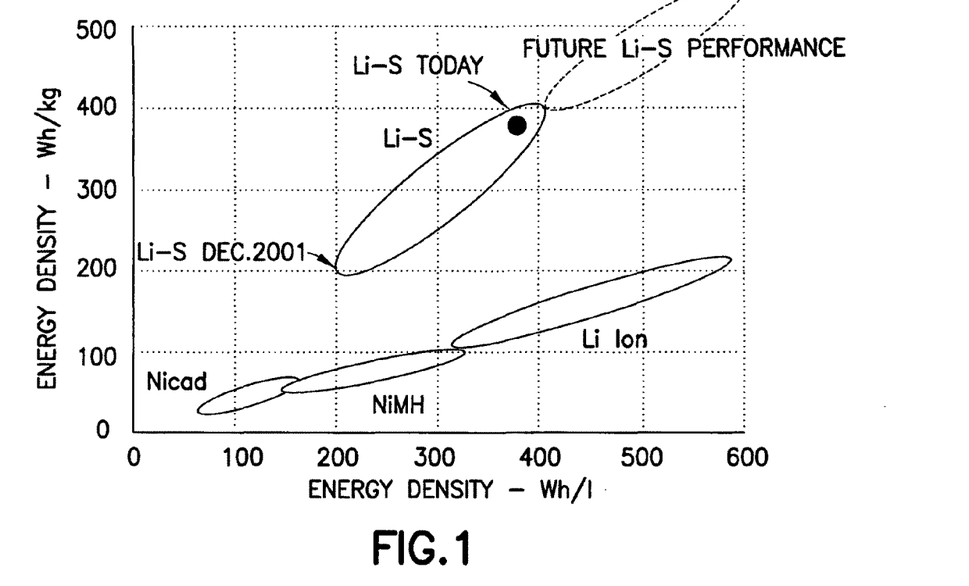
FIG. 1 is a graph comparing volumetric and gravimetric energy density of a lithium-sulfur (Li—S) battery with other battery technologies, and showing "Future Li—S performance" in which embodiments of this invention fall.

In practice, the various problems noted above hinders the complete reaction to form $Li_2S$. However, the performance of current commercial Li—S batteries is still higher than conventional lithium ion batteries as shown in FIG. 1, at least in the mass energy density category which is plotted along the vertical axis. Improvements to Li—S technology is expected to follow the dashed line in which Li—S would also outperform lithium ion batteries also in the volume energy density category shown along the horizontal axis of FIG. 1.

To date, various carbon-sulfur composites have been used to improve the Li—S battery performance, but they have limitations owing to the scale of the contact area. Typical reported capacities are between 300 and 550 mA–h/g at moderate rates, such as are described at P. T. Cunningham, S. A. Johnson, and E. J. Cairns, J. ELECTROCHEM. SOC., 119 (1972) 1448. In response to many considerable challenges, novel advances in materials design such as new electrolytes [see for example J. H. Shin and E. J. Cairns, J. ELECTROCHEM. SOC., 155 (2008) A368] and protective films for the lithium anode [see for example K. I. Chung, W. S. Kim, and Y. K. Choi, J. ELECTROANAL. CHEM., 566 (2004) 263] have been developed. Combinations of electrolyte modification, additives and anode protection have resulted in some promising results according to J. R. Akridge, Y. V. Mikhaylik, and N. White, SOLID STATE ION, 175 (2004) 243. Much of the difficulty still remains at the cathode, where the lack of breakthroughs has led to some cell configurations in which all of the sulphides are solubilised. More recently, it has been demonstrated that cathodes based on sulfur/mesoporous carbon materials can overcome these challenges to a large degree, and exhibit stable, high, reversible capacities (up to 1,320 mAh/g) with good rate properties and cycling efficiency [see for example X. Ji, K. T. Lee, and L. F. Nazar, NATURE MATERIALS, 8 (2009) 500].

Lithium-sulfur batteries, which can potentially store several times more energy than lithium ion batteries, have historically been too costly, unsafe and unreliable to make commercially. As will be shown in the exemplary embodiments below, improvements to the design of these batteries by nanotechnology can overcome such problems and bring the much more enhanced energy density Li—S batteries to the portable electronics as well as high-energy requested applications such as electric vehicles.

SUMMARY

The foregoing and other problems are overcome, and other advantages are realized, by the use of the exemplary embodiments of this invention.

In a first aspect thereof the exemplary embodiments of this invention provide an apparatus (e.g., an anode or cathode for a rolled or flexible battery) comprising: a first conductive substrate comprising a first surface; a plurality of conductive stalks extending from the first surface of the first conductive substrate; an electrically insulating coating about the conductive stalks; a second conductive substrate; and an electrolyte disposed between the first surface of the first conductive substrate and the second conductive substrate.

In a second aspect thereof the exemplary embodiments of this invention provide a method comprising: coating a catalyst on a surface of a conductive substrate; growing a layer of carbon nano-tubes on the catalyst coated surface, and applying an electrically insulating coating onto the grown carbon nano-tubes.

In a third aspect thereof the exemplary embodiments of this invention provide an apparatus comprising: first flexible conductive means comprising a first surface; a plurality of conductive stalks extending from the first surface of the first flexible conductive means; an electrically insulating coating about the carbon stalks; second flexible conductive means; and an electrolyte disposed between the first surface of the first flexible conductive means and the second flexible conductive means. In an embodiment, each of the first and second flexible conductive means is a distinct metal foil, such foil comprising for example at least one of Al, Au or Cu.

These and other aspects of the invention are set forth with particularity below.

DETAILED DESCRIPTION

The embodiments detailed herein describe an exemplary nenotechnology solution to the above detailed problems with Li—S batteries. Carbon nano-structures according to the exemplary embodiments described herein increase the cathode active area significantly and function as a sulfur container.

As a brief overview, sulfur is coated around a plurality or 'forest' of aligned carbon nano-tubes which are grown on a flexible metal substrate. In this manner, a high percentage of the sulfur atoms sit close to the conductive carbon, making them accessible to both electrons and lithium ions. The carbon nano-tubes also aid in dealing with polysulfides, which can cause a Li—S cell to fail prematurely by preventing a high number of recharges. The carbon tubes effectively trap the polysulfides in place until they are fully converted to dilithium sulfide, which is dealt with normally in the charge/recharge cycle and so the polysulfides do not accumulate to a point where they cause the Li—S battery to fail after a few cycles. Coating the carbon with a polymer that has an affinity for polysulfides also helps keep them in place. Specifically, thiol-terminated conducting polymers/conjugated molecules (e.g. orthomercaptoaniline) can be used to keep the polysulfides in place without sacrificing the conductance. See for example: Jui-Ming Yeh, Kuan-Yeh Huang, Su-Yin Lin, Yu-Yao Wu, Chao-Chen Huang, and Shir-Joe Liou, JOURNAL OF NANOTECHNOLOGY, 2009(2009)217469. These embodiments offer the possibility of high gravimetric capacities and theoretical energy densities ranging up to a factor of five beyond conventional Li-ion systems.

Exemplary embodiments of these teachings include highly ordered interwoven composites or layers, which show the feasibility of approaching such high gravimetric capacities. The aligned carbon nano-tube forest, which is conductive, precisely constrains sulfur nano-filler growth, which is insulative, within its spaces and generates essential electrical contact through the insulating sulfur. The structure provides access to Lithium-Carbon ingress/egress for reactivity with the sulfur, and the kinetic inhibition is diffuse within the framework of the coated carbon nano-tubes so the sorption properties of the carbon aid in trapping the polysulfides formed during redox. In a variation, there is a polymer modification of the carbon surface which further provides a chemical gradient that retards diffusion of these large anions out of the electrode, thus facilitating more complete reaction.

Figure 2:
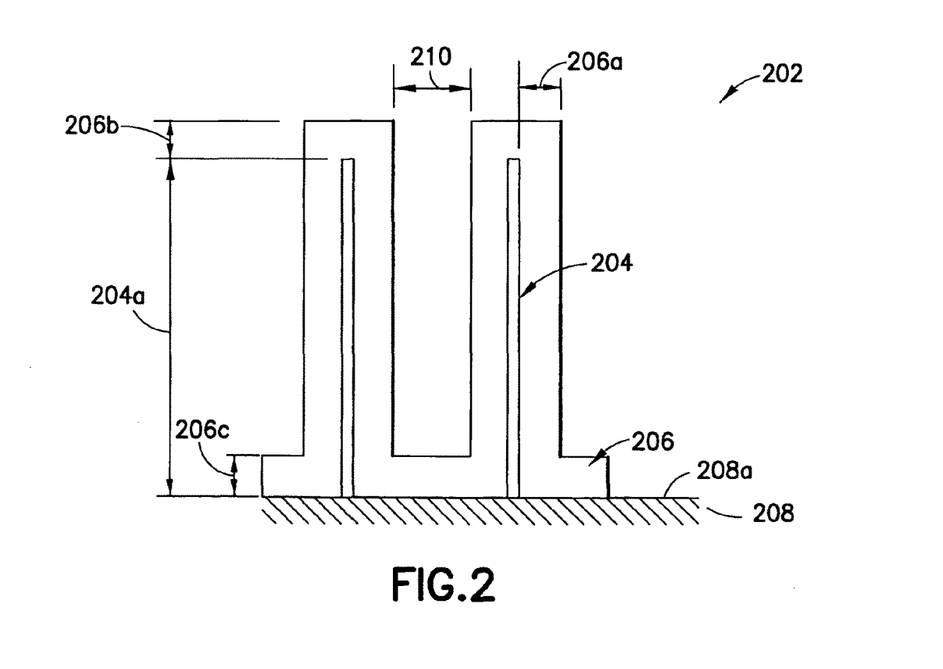
FIG. 2 is an expanded schematic sectional view of a portion of a Li—S battery cathode comprising aligned carbon nano-tubes coated with sulfur according to an exemplary embodiment of the invention.
Figure 3A:
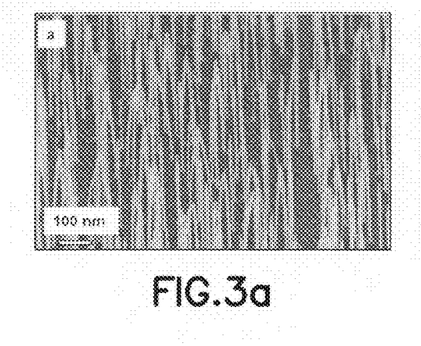
FIGS. 3a-b are SEM images of sparsely grown carbon nano-tubes at FIG. 3a and carbon nano-tubes coated with sulfur according to an embodiment of these teachings at FIG. 3b.
Figure 3B:
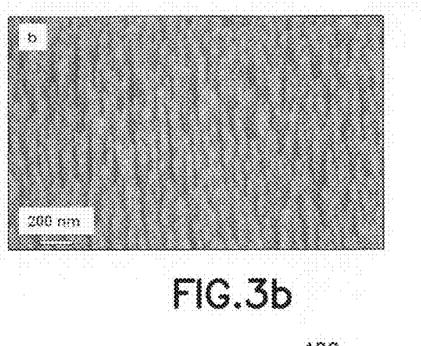

Now are described exemplary but non-limiting embodiments of the invention with more particularity. Consider FIG. 2, which shows an expanded view of a section of the Li—S battery cathode 202 which comprises aligned carbon nano-tubes 204 coated with sulfur 206. The carbon nano-tubes extend from a first surface 208a of a first conductive substrate 208 such as for example aluminum Al, copper Cu or gold Au. In an embodiment this first conductive substrate is flexible, as is a layer of common aluminum foil. With proper cleaning for the manufacture of a battery according to these teachings, common aluminum foil can itself serve as the first conductive substrate. It is not necessary that the carbon be tubular per se, they may equally be solid protrusions from the first conductive substrate 208, but grown carbon nano-tubes are one currently available structure for implementing this portion of the invention. In general, term these as conductive stalks, which may be solid rods or hollow tubes of carbon or other conductive materials. The examples below refer to carbon stalks for ease of explanation. There is a plurality of such carbon stalks 204 extending from the first surface 208a in a generally aligned manner, as trees in a forest or fibers which make up the pile of a carpet. The carbon stalks 204 extend generally perpendicular from the surface 208a. The term 'generally perpendicular' as used herein means perpendicular as averaged across a large multitude of closely spaced stalks, such as is shown at the micrographs of FIGS. 3*a-b* in which individual stalks may vary somewhat from true perpendicular. The forest of aligned carbon stalks 204 can be made by known mass-production techniques, as well as the sulfur coating 206 to form the overall electrodes.

In an embodiment, the thickness of the sulfur 206 about the carbon stalks, which thickness extends along the entire length 204*a* of the stalks and which is shown as reference number 206*a*, is about 3 nanometers, +/− about 1 nanometer. Even if the thickness of this sulfur layer 206 is not uniform, there is a layer of sulfur that coats substantially the entire length 204*a* of each stalk extending from the surface 208*a*. A maximum thickness of 3 nm+/−1 nm assures that the insulative properties of the sulfur overlayer 206 do not negate the conductive properties of the underlying carbon stalks 204, enabling the ions to bind to the coated stalks when the battery is in operation (charging or discharging) despite sulfur's insulative properties. As will be evident from the process detailed below for applying this sulfur coating 206, generally the thickness 206*c* of the sulfur over the first surface 208*a* of the first conductive substrate 208 will be similar to the thickness 206*a* along the length 204*a* of the carbon stalks 204, and the thickness 206*b* by which the sulfur coating extends a length 204*a* of the carbon stalks 204 will also be similar. It is clear that the more important sulfur thickness is along the length 204*a* of the carbon stalk 204, since the relative surface areas along the length 204*a* of the stalks 204 far exceeds that which is available through the sulfur thickness 206*c* along the substrate 208 itself or along the tips of the carbon stalks shown as 206*b*. The carbon stalks 204 are spaced from one another such that, after the sulfur coating 206 is applied to the desired thickness 206*a*, there is a gap 210 between them which, on average across all the stalks, is at least the diameter of two lithium ions (or whatever ion carries the electrical charge between anode and cathode in the overall battery) and is preferably not more than two orders of magnitude higher than that. This assures that an ion which is bound to a portion of the coated stalk 204 furthest from the substrate 208 does not block mobility of other ions from binding to the lower reaches of that same stalk and adjacent ones.

Preferably for the case that the stalks are embodied as nano-tubes, an average diameter (of an outermost wall if the subject nano-tube is multi-walled) is in the range from 10 to 100 nanometers, and a pitch between adjacent multi-walled carbon nano-tubes is in the range from 20 to 500 nanometers (somewhat less for single wall nano-tubes). In the carbon nano-tube array, the lithium ions are able to intercalate not only inside the multi-walled carbon nanotubes, but also in the interstices between adjacent multi-walled or single walled carbon nano-tubes. Thus a density of intercalation of the multi-walled carbon nano-tube array is significantly higher than that of graphite. The coating of sulfur around the carbon nano-tubes can be adjusted by thickness, but the minimum thickness should be around 2-3 nm (larger than the diameter of the lithium ion). The atomic radius of the lithium atom is 152 pm and the diameter for a dissolved lithium ion should be less than 1 nm. The gap between coated stalks should be at least the larger than the diameter of the lithium ion, i.e. 1 nm.

FIGS. 3*a* and 3*b* are scanning electron microscope SEM images. FIG. 3*a* is a higher resolution image of sparsely grown carbon nano-tubes which extend from the underlying substrate. FIG. 3*b* is a slightly lower resolution image of similar such carbon nano-tubes with a sulfur coating over them, similar to those shown schematically at FIG. 2. This perspective view of the coated stalks with reference to the scale at the bottom left of that image shows that the coated stalks are spaced sufficiently far that lithium ions, whose diameter is about 1.48 angstroms and which attach near the tip of individual coated stalks, would not impede movement of other lithium cations toward inner reaches of those same or adjacent coated stalks. FIG. 3*b* illustrates an average gap 210 of about 30 nm, or one order of magnitude greater than the diameter of two lithium ions.

The aligned forest of conductive stalks precisely constrains sulfur nano-filler growth within its spaces and generates essential electrical contact to the insulating sulfur. The sulfur coating 206 is such that individual stalks 204 are still apparent (given sufficient resolution as in FIG. 3*b*), though of course in a practical embodiment some pairs or bunches of carbon stalks 204 may not be individually separable after coating due to practical limits of manufacturing precision. The imprecision in stalk alignment and spacing shown at the high resolution images of FIGS. 3*a-b* illustrate that it is average spacing and thickness which are the practical values for designing to a certain battery performance. Once a designer selects a desired sulfur thickness 206*a* along the length of the carbon stalks 204, then spacing constraints for the gap 210 between coated stalks gives the manufacturer the required density of the carbon stalks 204 which are grown on the substrate 208. If the coating 206 were too thick or the carbon stalks 204 were too densely packed, much or all of the length of the carbon stalks 204 would be unavailable for ion attachment due to the insulative properties of the sulfur.

Figure 4:
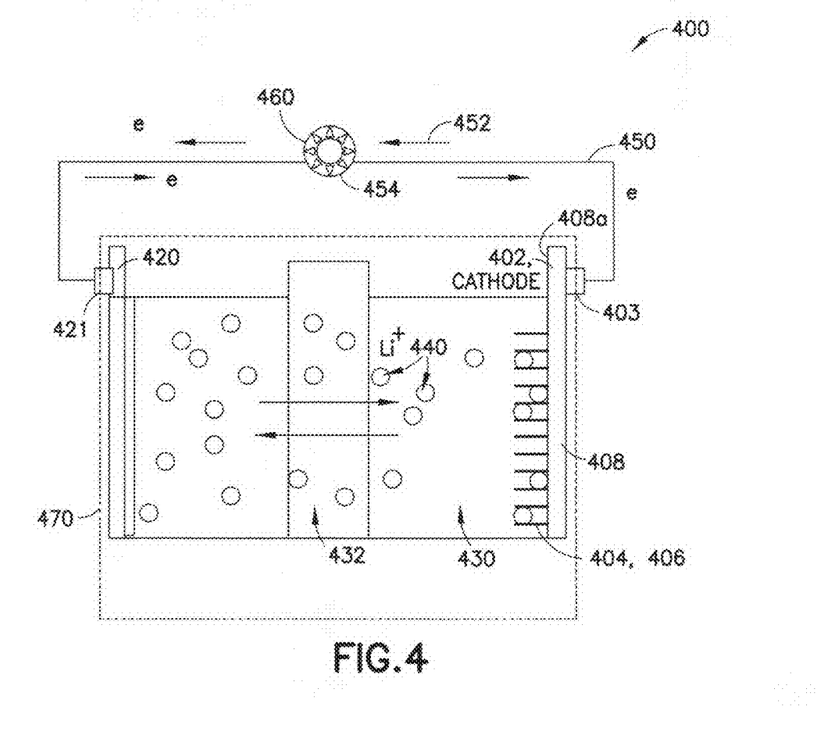
FIG. 4 is a schematic sectional view of a lithium-sulfur battery according to an exemplary embodiment of the invention, showing also a load/charge potential and bridge circuit for completeness.

FIG. 4 illustrates in schematic form a lithium-sulfur battery 400 according to an embodiment of the invention. The carbon stalk/sulfur cathode 402 is similar to that shown at FIG. 2, in which the first conductive substrate 408 is a charge collector into which current flows while in the battery charging mode, and is a charge storage medium from which current flows while the battery is in the discharge mode. In the FIG. 4 embodiment the first conductive substrate is a flexible metal foil. Shown also are the carbon stalks 404 with a sulfur coating 406, extending from the first surface 408*a* of the first conductive substrate 408.

The anode is a second conductive substrate 420 which in the FIG. 4 embodiment is a flexible lithium foil. Disposed between them is an electrolyte 430 which provides mobility for the lithium ions 440. As illustrated at FIG. 4 there is a separator layer 432 having pores through which the lithium ions 440 may pass, and conventional electrolyte 430 on either side of that separator layer 432.

For completeness, FIG. 4 also shows a bridge circuit 450 which couples a first terminal 403 of the cathode 402 to a second terminal 421 of the anode 420 through a load 460 (in the case of discharge 452) or potential 460 (in the case of charge 454). The cathode 402, anode 420, electrolyte 430 and separator layer 432 are all disposed within a housing 470 such as plastic or fiber or other non-conductive material, and the terminals 403, 421 penetrate the housing 470 to electrically contact the respective cathode 402 and anode 420. The battery is then disposed within a host device which has the actual bridge circuit coupling in the load and/or charge potential 460 to the battery via the terminals 403, 421.

When there is a load 460 in the circuit 450, current in the form of electrons flows from the cathode 402 to the anode 420 along the discharge direction 452 as shown. The accumulating electrons at the anode 420 attract lithium ions 440 which are attached to the coated stalks 404/406 of the cathode 402. These lithium ions 440 mobilize through the electrolyte 430 and pass through the separator layer 432 and are attracted to the greater concentration of electrons at the anode 420 while at the same time there is a diminishing concentration of electrons holding those ions 440 at the cathode 402 due to movement of electrons from cathode 402 to anode 420 across the bridge circuit 450 in the discharge direction 452.

A reverse of the discharge process occurs in the charge process when there is a potential applied at 460 in the circuit 450. In this case, current flows from the anode 420 to the cathode 402 along the charge direction 454 as shown. The accumulating electrons at the cathode 402 attract lithium ions 440. These lithium ions 440 originated from the anode 420 and passed through the electrolyte 430 and through the separator layer 432. Electron movement is from anode 420 to cathode 402 along the bridge circuit 450 in the charge direction 454. The greater concentration of electrons at the cathode 402 with simultaneous diminishing concentration of electrons holding those ions 440 at the anode 420 drive the cations 440 through the electrolyte 430. Once those cations 440 arrive at the cathode 402, they become attached to the coated stalks 404/406 of the cathode 402 which provide a substantially larger surface area for attachment than the first surface 408*a* of the first conductive substrate 402 alone would provide.

Various embodiments of the Li—S battery shown schematically at FIG. 4 include any combination of the following. The first conductive substrate may be a flexible metal foil, such as for example aluminum, iron, stainless steel, copper or gold, or conductive compounds made or allowed with any one or more of those. The conductive stalks may be solid rods or hollow tubes, and may be carbon or some other conductive material. The electrically insulating coating 406 about the conductive/carbon stalks may be sulfur or compounds made therefrom, or other insulating materials which can be disposed at a requisite thickness such that, at the cation diameter level of precision, the stalks generally remain separate from one another with a gap between adjacent stalks (manufacturing imprecisions excepted). The electrolyte 430 may be any substance containing free ions that behaves as an electrically conductive medium, and for example the electrolyte may be a composite of a lithium salt and one of the following polymers: ethylene carbonate (EC), diethylene carbonate (DC) and propylene carbonate (PC). Alternatively, the electrolyte may be a room temperature ionic liquid electrolyte. The room temperature ionic liquid electrolyte may comprise 1-butyl, 3-methylimidazolium chloride ([BMlM][Cl]), 1-25% of cellulose and a lithium salt. The separator layer 432 may be, for example, a microperforated plastic film made of polyethylene (PE), polypropylene (PP), a combination of them both, or paper. The electrolyte 430 may be disposed on surfaces of the separator layer 432/plastic film. The second conductive substrate may be, for example, lithium metal oxide such as for example lithium cobalt oxide ($LiCoO_2$), lithium manganese oxide ($LiMnO_4$), lithium nickel oxide ($LiNiO_2$) and lithium iron phosphate ($LiFePO_4$).

Note that the specific embodiments for the anode and cathode in the description of FIGS. 2 and 4 are exemplary; other arrangements which incorporate these teachings may have the coated carbon tubes extending from the first substrate in the position of the anode and the lithium oxide substrate in the position of the cathode.

Figure 5:
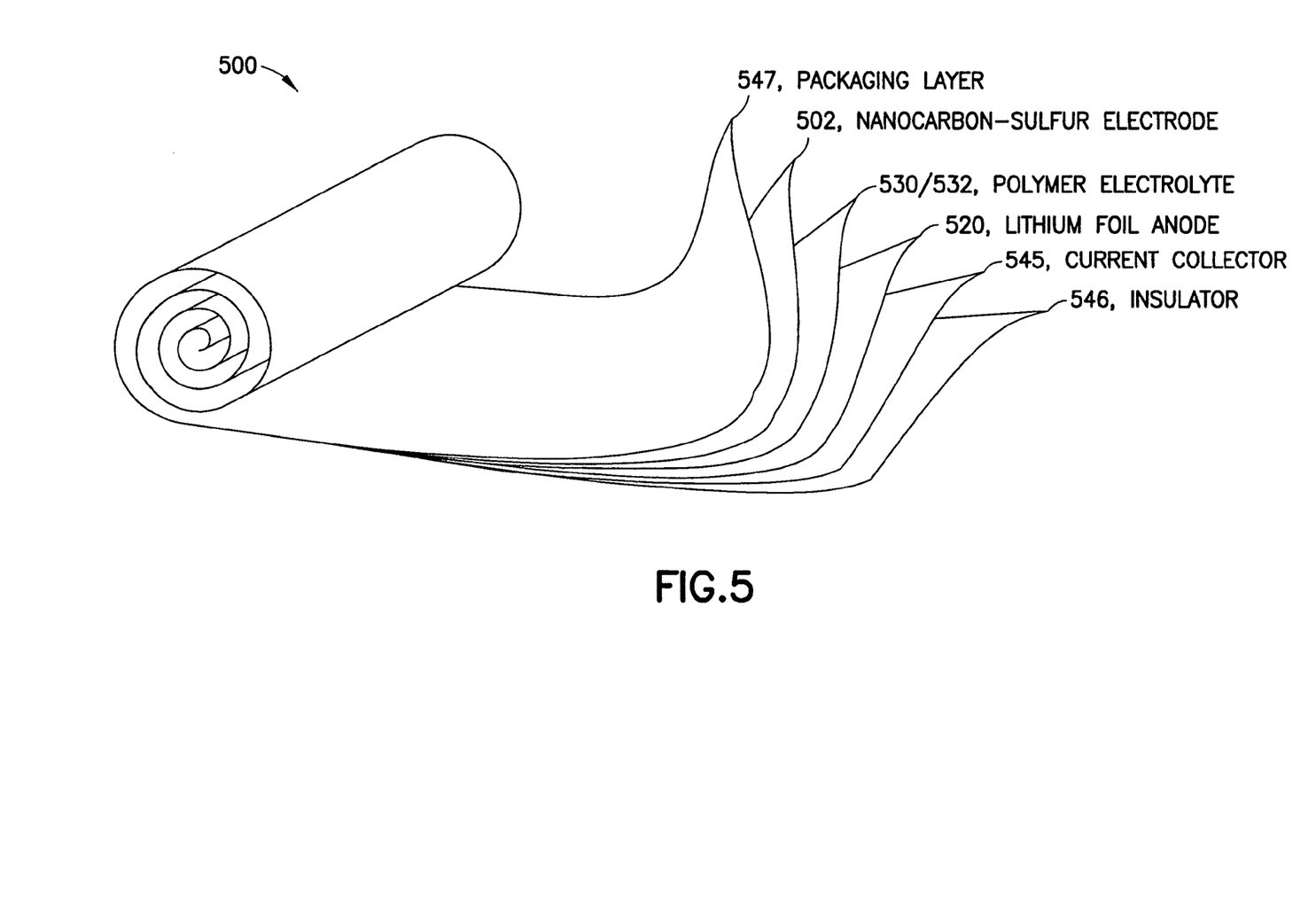
FIG. 5 is a schematic perspective exploded view of a flexible lithium-sulfur battery according to these teachings using a polymer electrolyte.

FIG. 5 illustrates a particular embodiment of a Li—S battery according to these teachings made with flexible substrates, which are then rolled and hermetically sealed with leads from the anode and cathode for connecting with a bridge circuit 450 of FIG. 4 in which the load or charge potential is applied. In this particular embodiment there is a nanocarbon-sulfur electrode layer 502 which is similar in structure to the cathode 402 described for FIG. 4. Adjacent to the nanocarbon-sulfur electrode layer 502 is a polymer electrolyte layer 530/532 which by example may be similar to the separator layer 432 of FIG. 4 with electrolyte material 430 disposed on either side. Next is a lithium foil anode layer 520 which is similar in structure to the anode 420 at FIG. 4. A current collector layer 545 lies adjacent to the lithium foil anode layer 520 and is a more conductive layer than layer 520 to collect charge. There is another layer of insulator 546 and a packaging layer 547 (also insulating), which when the assembled layers are wrapped as shown at FIG. 5 form the respective outermost and innermost layers of the battery 500.

Whether implemented as a rolled multi-layer apparatus 500 such as shown at FIG. 5 or otherwise, embodiments of this invention with the polymer electrolyte provide a sulfur-lithium battery with enhanced energy storage as compared to the prior art. Such a Li—S battery may be deployed in portable devices such as mobile telephones or other personal electronic devices (e.g., personal digital assistants (PDAs), portable computers/laptops/palmtops, image capture devices such as digital cameras, gaming devices, music storage and playback appliances and Internet appliances), as well as vehicles such as automobiles, aircraft, watercraft and the like. These are examples and not limiting to the uses for which various embodiments of a Li—S galvanic battery according to these teachings may be deployed.

Figure 6:
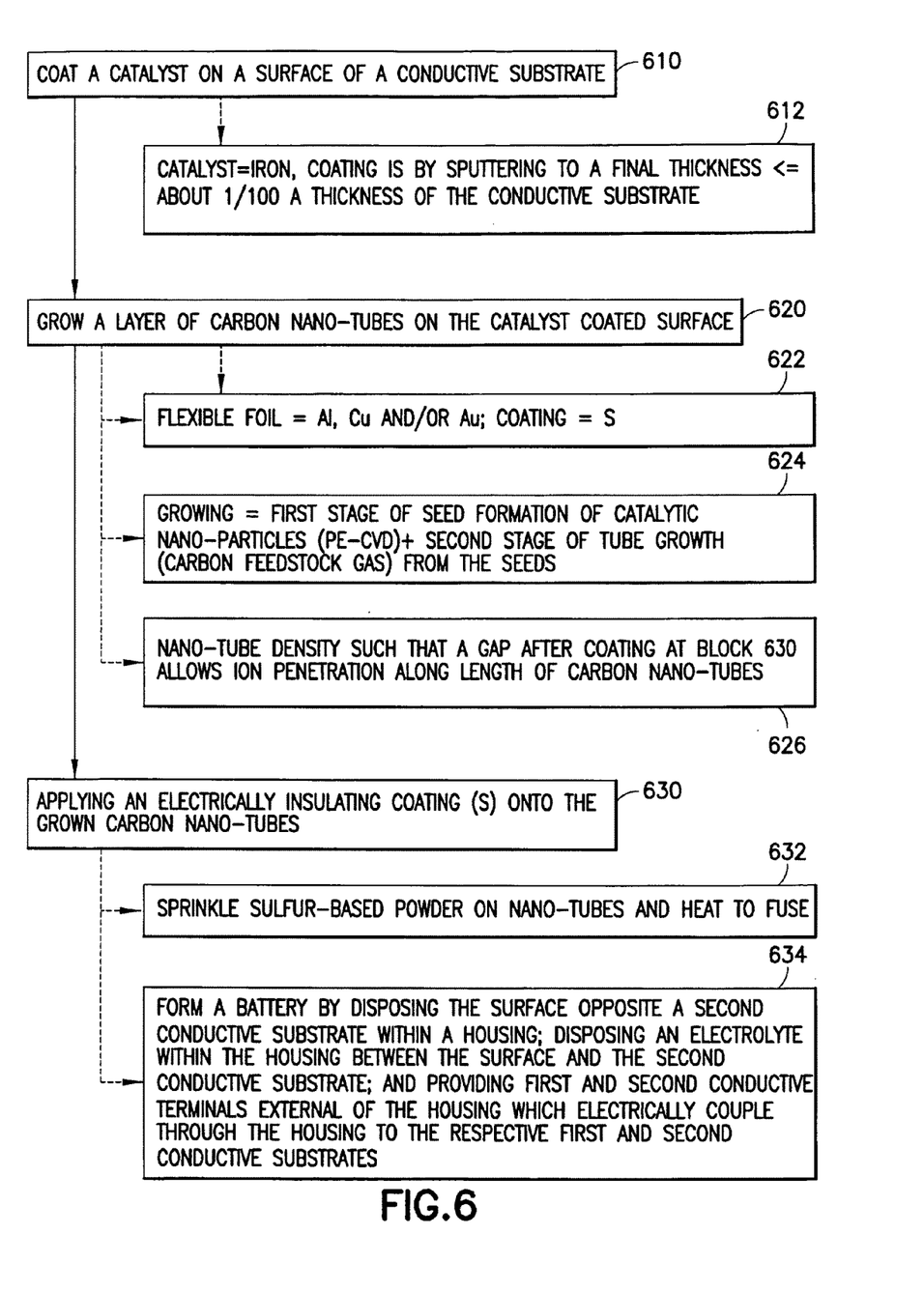
FIG. 6 is a logic flow diagram that illustrates the operation of a method, and a result of execution of computer program instructions embodied on a computer readable memory, in accordance with the exemplary embodiments of this invention.

Now is described with reference to FIG. 6 an exemplary method of making a Li—S battery according to the teachings above, particularly making the first substrate with the extending conductive stalks with the sulfur coating thereon. This exemplary method employs growing carbon nano-tubes as the conductive stalks on a conductive substrate such as for example a flexible metal foil. FIG. 6 is a logic flow diagram that illustrates the operation of a method, and a result of execution of computer program instructions, in accordance with the exemplary embodiments of this invention.

The exemplary method can be divided into three main steps: coating a catalyst on a surface of a conductive substrate at block 610; growing a layer of carbon nano-tubes on the catalyst coated surface at block 620, and applying an electrically insulating coating onto the grown carbon nano-tubes (e.g., sulfur) at block 630. Other portions of FIG. 6 are specific implementation details for an exemplary embodiment. The various blocks shown in FIG. 6 may be viewed as method steps, and/or as operations that result from operation of computer program code which controls physical manufacturing machinery which executes the method, and/or as a plurality of coupled logic circuit elements constructed to control such physical manufacturing machinery to carry out the associated function(s).

In an embodiment, the conductive substrate is a flexible metal foil such as aluminum, gold or copper as seen at block 622. For example, commercially available, 10 μm thick aluminum foil is cut and cleaned using consecutive acetone and isopropanol sonications for 5 minutes which is followed by a rinse with deionized water and drying under a nitrogen flow (e.g., with a nitrogen gun). In an embodiment the catalyst comprises iron disposed over the surface of the cleaned foil as a thin film at a thickness of a few nanometers thick. Note that the thickness of the iron film is less than $\frac{1}{100}$ of the thickness of the 10 μm thick metal foil substrate on which the catalyst is coated, as seen at block 612. Sputtering can be used to dispose the iron film on cleaned foils, such as for example using a DC sputtering system at a power level of 50 W and at a base pressure of $2*10^{-6}$ mbars.

In an embodiment, the layer of multi-walled carbon nano-tubes are grown on the catalyst coated surface using plasma-enhanced chemical vapor deposition (PE-CVD, for example using a system available through Aixtron AG, of Herzogenrath, Germany). In a practical embodiment, growth of the carbon nano-tubes was done in a quartz vacuum chamber on a resistively heated graphite stage. Growth temperature was controlled by a thermocouple attached to the surface of the graphite stage. Growth can be considered as comprising two stages as shown at block 624: seed formation of catalytic nano-particles, and tube growth from the seeds. For the first stage of seed formation, following deposition of the iron film catalyst, samples were placed on the graphite stage in the quartz chamber, which was then evacuated to 0.2 mbar. The samples were then heated up to 480° C. with ammonia gas ($NH_3$, at a 200 standard cubic centimeters per minute sccm flow rate), and annealed at this temperature for 2 minutes. Catalytic nano-particles were found on the foil after this annealing, which is important for low temperature growth of the ultimate carbon nano-tubes. This completed the seed formation stage.

For the tube growth stage, after annealing in the seed formations stage the graphite stage temperature was ramped to 530° C. Flow of the ammonia gas was discontinued and acetylene ($C_2H_2$) was supplied (at a 200 sccm flow rate) as the carbon feedstock for the carbon nano-tube growth. The chamber pressure then was maintained at 10 mbar. After a growth period of 15 minutes, C2H2 and heating was turned off and samples were cooled to room temperature with nitrogen gas (200 sccm flow rate). Fifteen minutes of growth yielded multi-walled carbon nano-tubes of length 70 μm as measured from the foil substrate surface, which were aligned and closely packed. Of course, different lengths of carbon nano-tubes can be obtained, (e.g., from ranges of a few hundred nanometers to 100 μm or so) by using the above process and varying the growth time in the second stage.

The tube density depends on the ion diameter in the final battery (depending on the material of the other conductive foil) and the thickness of the insulating overlayer/sulfur (and of course the diameter of the nano-tubes themselves since the operative constraint in for ions to penetrate the gap between the coated nano-tubes). Exemplary guides to a proper nano-tube density are given above with reference to FIG. 2, and a general statement of the end-goal for determining that density is shown also at block 626 of FIG. 6.

The third main step is then applying an electrically insulating coating to the grown carbon nano-tubes, the coating comprising for example sulfur, which is also noted at block 622. In the practical embodiment, pure sulfur (negligible volume of contaminants excepted) was used in this step but compounds containing sulfur can also be used such as for example aromatic polysulfur tricyclic compounds. The sulfur was ground to a fine powder, sprinkled over the grown carbon nano-tubes and the entire foil assembly was heated to 160° C., which fused the sulfur to the aligned carbon nano-tubes as a coating as shown at block 632. As will be appreciated, fusing powdered sulfur over multiple nano-tubes may leave certain portions along the length of a few nano-tubes uncoated, and so the nano-tubes are substantially coated with the sulfur coating, substantially meaning at least 95% (and more preferably 98%) of the exterior surface of all nano-tubes taken as a whole has a sulfur-based coating over it.

For completeness, at block 634 the battery is formed by disposing the surface with the coated nano-tubes opposite a second conductive substrate within a housing, and disposing an electrolyte within the housing between that surface from which the coated nano-tubes extend and the second conductive substrate, and also providing first and second conductive terminals external of the housing which electrically couple through the housing to the respective first and second conductive substrates. The formed battery is then disposed by a downline manufacturer within a host device such as for example a mobile phone, laptop computer, or a vehicle (car, boat, airplane) within which at least one of a load and a voltage potential are coupled to the first and to the second terminals via a bridge circuit. The bridge circuit itself is part of the host device.

Exemplary embodiments of the invention detailed above provide the technical effect of a flexible nano-structured lithium-sulfur battery with enhanced energy density. Such a battery based on the teachings set forth above exhibits advantages over conventional batteries in at least a higher power density on a weight or volume basis respectively than any traditional lithium or lithium ion batteries (and in some embodiments significantly higher), and extended battery life as compared to conventional batteries which have the technical effect of extending the practical applications in which a galvanic battery can be economically used beyond multi-functional portable electronics to higher electric demand devices such as electric vehicles (automobiles, watercraft, and possibly aircraft given the higher power density per weight).

We stipulate that some of the features of the various non-limiting and exemplary embodiments of this invention may be used to advantage without the corresponding use of other described features (e.g., the coated conductive stalks may find some other practical implementation apart from a battery as described), and the various optional features detailed herein may be combined individually or in any multitude of combinations into the broader aspects of the invention detailed herein. As such, the foregoing description should be considered as merely illustrative of the principles, teachings and exemplary embodiments of this invention, and not in limitation thereof.

What is claimed is:

1. An apparatus comprising:
    a first conductive substrate comprising a first surface;
    a plurality of conductive stalks extending from the first surface of the first conductive substrate, the conductive stalks being aligned relative to adjacent conductive stalks;
    an electrically insulating coating about the conductive stalks;
    a second conductive substrate;
    an electrolyte disposed between the first surface of the first conductive substrate and the second conductive substrate; and
    a separator layer between the first conductive substrate and the second conductive substrate and on which the electrolyte is disposed along opposed surfaces thereof;
    wherein the conductive stalks comprise carbon and the electrically insulating coating comprises sulfur;
    wherein the conductive stalks are perpendicular to the first conductive substrate and to the separator layer; and
    wherein the plurality of conductive stalks are disposed at a density such that a gap between the stalks having a the electrically insulating coating applied thereabout is between about 2 and 200 diameters of an ion which passes between the second conductive substrate and is attached to the coated stalks by electrical attraction while the apparatus is in operation as a galvanic battery.

2. The apparatus according to claim 1, in which the conductive stalks extend generally perpendicular from the first surface.

3. The apparatus according to claim 1, in which the electrically insulating coating comprises sulfur disposed at a thickness of about 3 nanometers.

4. The apparatus according to claim 3, in which the second conductive substrate comprises an oxide of lithium.

5. The apparatus according to claim 4, the separator layer having a porosity amenable to passage by ions moving between the first conductive substrate and the second conductive substrate.

6. The apparatus according to claim 5, in which the electrolyte comprises a polymer.

7. The apparatus according to claim 2, in which the conductive carbon stalks comprise carbon nano-tubes which are directly attached to the first surface of the first substrate.

8. The apparatus according to claim 1, in which the apparatus comprises a battery in combination with a bridge circuit which electrically couples a first terminal of the first substrate to a second terminal of the second substrate, and at least one of a load and a voltage potential for discharging or charging the battery disposed within the bridge circuit.

9. The apparatus according to claim 1, wherein the electrically insulating coating is further disposed on the first surface of the first conductive substrate.

* * * * *